United States Patent
Sheu

[11] Patent Number: 6,033,033
[45] Date of Patent: Mar. 7, 2000

[54] WHEEL RIM COVER

[75] Inventor: Lih-Ching Sheu, Tainan Hsien, Taiwan

[73] Assignee: Kuan Hsieng Industrial Co., Ltd., Tainan Hsien, Taiwan

[21] Appl. No.: 09/076,321

[22] Filed: May 13, 1998

[51] Int. Cl.$^7$ ..................................................... B60B 7/00
[52] U.S. Cl. ...................................... 301/37.1; 301/37.33
[58] Field of Search .............................. 301/37.1, 37.29, 301/37.31, 37.32, 37.33, 37.42

[56] References Cited

U.S. PATENT DOCUMENTS 5,772,287   6/1998   Sheu ...................................... 301/37.32

*Primary Examiner*—Russell D. Stormer
*Attorney, Agent, or Firm*—Bacon & Thomas

[57] ABSTRACT

A wheel rim cover that is mainly comprised of a circular plate and a number of fastener components. During installation, there are a number of engraved holes facing outward on the surface of the circular plate, with the edges of the engraved holes extending towards the interior side of the circular plate. Furthermore, an edge reinforcement is inclined towards the center of each of the engraved holes and formed at the final extent of the edge reinforcement is an end hole that is smaller than the engraved holes. The fastener components are positioned on the surface of the circular plate facing inward during assembly and a retainer mount is formed at the end.

1 Claim, 3 Drawing Sheets

WHEEL RIM COVER

BACKGROUND OF THE INVENTION

1. Field of the Invention

The invention herein relates to a kind of wheel rim cover that is of simple structure and provides for a reduced material height when stacked and, furthermore, a positioning of the fastener components that increases the strength of the wheel rim cover.

2. Description of the Related Art

As indicated in FIG. 1 and FIG. 2, the structure of a conventional wheel rim cover generally includes a circular plate (1) and fastener components (2). The said circular plate (1) has a number of decorative nut caps (11) and elongated engraved holes (12) along the outer periphery and, furthermore, the said engraved holes (12) have reinforcement edges (13) oriented towards the interior side of the circular plate (1). There are rim mounts (14) along outer edges on the interior side of the circular plate (1) and the said rim mounts (14) are conjoined to the reinforcement edges (13) of the engraved holes (12), with a number of fastener components (2) protruding at appropriate intervals thereon. Two projecting edges (21) and (22) are formed on the inner side of each fastener component (2) and a coil spring (23) can be inserted in between the two projecting edges (21) and (22) of each fastener component (2) to facilitate the attachment to the steel rim of the tires by means of numerous tabs (241) protruding from the fastener assemblies (24) on the outside.

In the said wheel rim structure, when two pairs of wheel rims are stacked, the lower extent of the fastener components (2) on the wheel rim cover is positioned exactly on the upper extent of the circular plate (1), causing the overall height of the stack to be increased by the projecting fastener components (2) and the rim mounts (14) of the circular plates (1). Such an increase in stacked height results in the utilization of larger quantities of packaging material, which in addition to creating shipping difficulties and storage space wastage, increases shipping costs because of the greater cubic footage density. Therefore, the said conventional wheel rim structure cannot be considered ideal.

Referring to FIG. 3, a structure of the "Wheel Rim Cover" shown in the skew. U.S. Pat. No. 5,772,287, includes a circular plate (31) of the wheel rim cover (3) which, when installed, provides a number of engraved holes (33) on the surface that face outward and the edges of the engraved holes (33) extend inwards; furthermore, there are edge reinforcements (34) inclined towards the center of the engraved holes (33), with a small end hole (33) formed at the final extent of each edge reinforcements (34); there is a securing mount (36) formed on the said end hole (35) that curves slightly inward, and the said fastening components (37) are positioned onto the securing mounts (36) such that when the wheel rim cover (3) is stacked, the fastener components (37) at the upper extent of the wheel rim cover (3) is in exact alignment with and inside the engraved holes (33) at the lower extent of the wheel rim cover (3).

Although the stack height is reduced in the said U.S. Pat. No. 5,772,287, since the number and shape of the engraved holes in the wheel rim cover is subject to innovative design changes in which a particular pattern layout is the most important factor that affects positioning, the fastening components of some wheel rim covers are not positioned to facilitate engagement onto the slightly curved securing mounts formed at the final extent of the end holes in the reinforcement edges of the engraved holes and, therefore, additional stacking time must be spent to reduce the height of the wheel rim structure to economize packing material quantity and thereby decrease shipping charges.

SUMMARY OF THE INVENTION

The objective of the invention herein is to provide an improved wheel rim structure that is mainly comprised of a circular plate and a number of fastener components. The said circular plate has numerous engraved holes on the surface and the edges of the engraved holes extend towards the interior side of the circular plate. Furthermore, there is an edge reinforcement inclined towards the center of each engraved holes and formed at the final extent of the edge reinforcement is an end hole that is smaller than the engraved holes. The aforesaid fastener components are positioned on the surface of the circular plate facing inward during installation, with a retainer mount formed at the end. Each fastener component is positioned in between the edge reinforcements and end holes of two aforesaid engraved holes, and the distance from the fastener components to the center of the circular plate surface is less than the distance between the maximum outer edge dimension around the interior width of the engraved holes and the center of the circular plate surface.

BRIEF DESCRIPTION OF THE DRAWINGS

Other features and advantages of the invention herein shall become apparent in the following detailed description of the preferred embodiments, with reference to the drawings below.

DETAILED DESCRIPTION OF THE PREFERRED EMBODIMENTS

Figure 1:
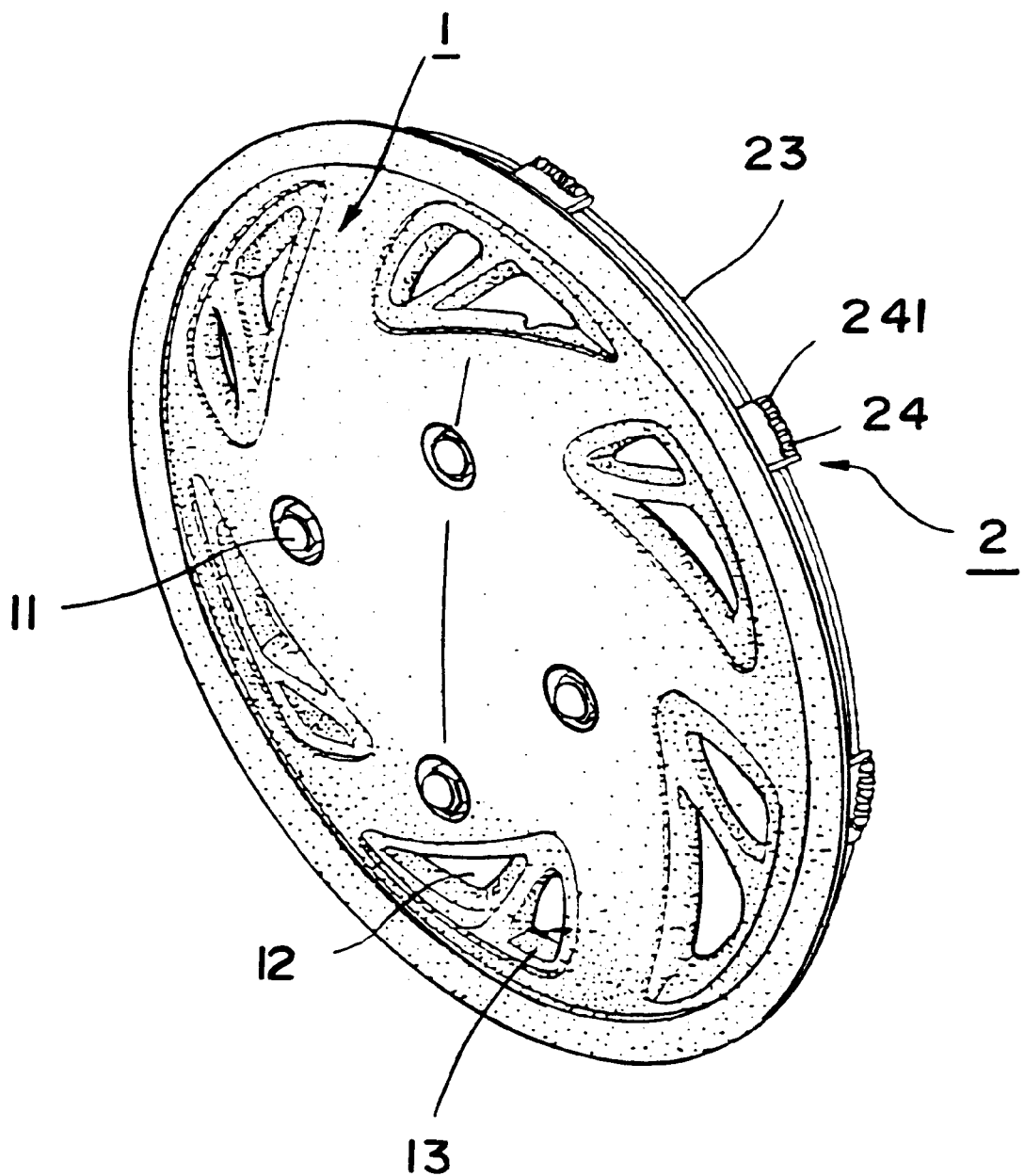
FIG. 1 is a perspective view of a conventional wheel rim cover.
Figure 2:
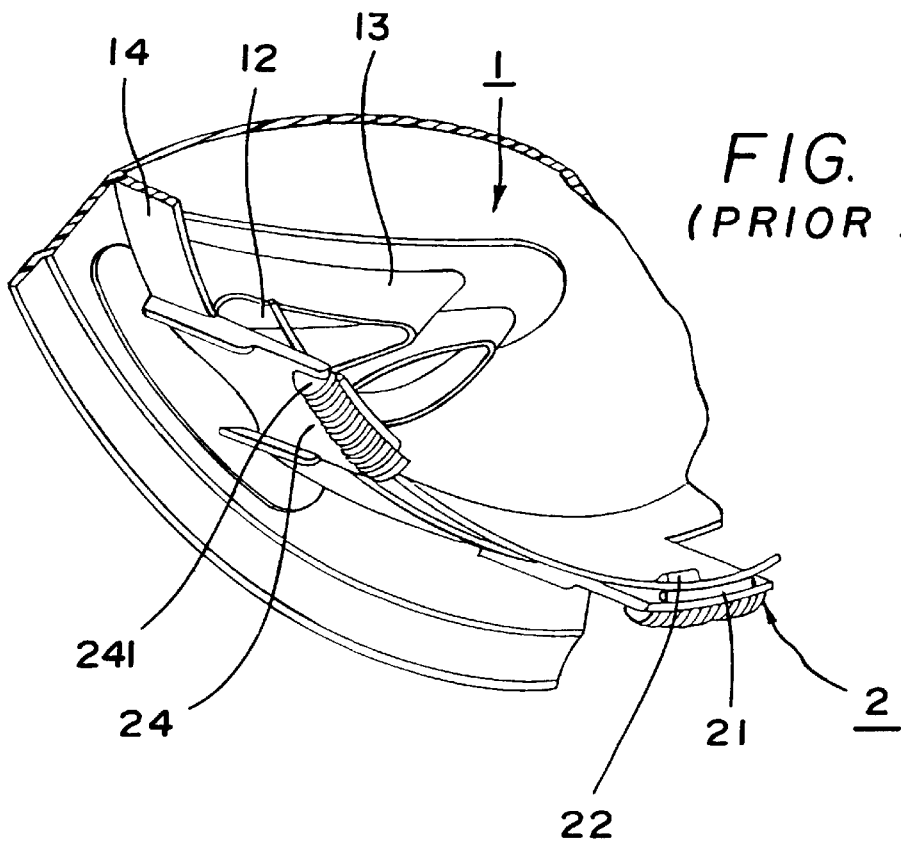
FIG. 2 is a partial perspective view of the interior side of the conventional wheel rim cover.
Figure 3:
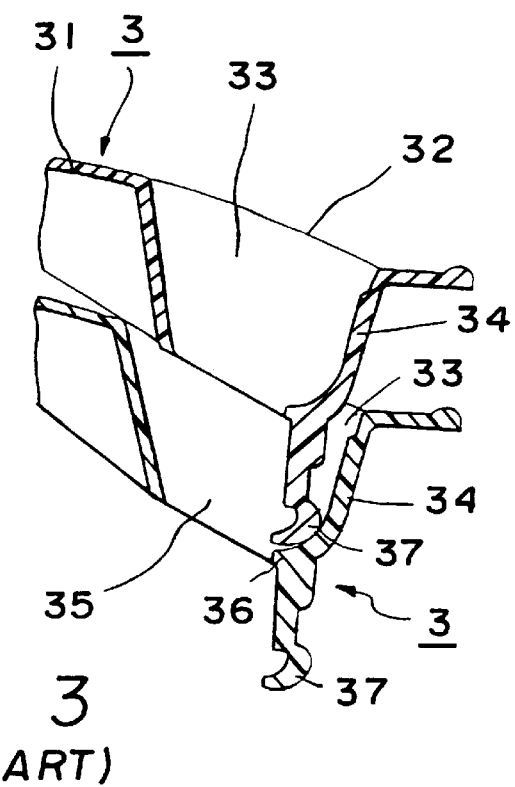
FIG. 3 is a cross-sectional view of the conventional "Wheel Rim Cover" structure shown in U.S. Pat. No. 5,772,287.
Figure 4:
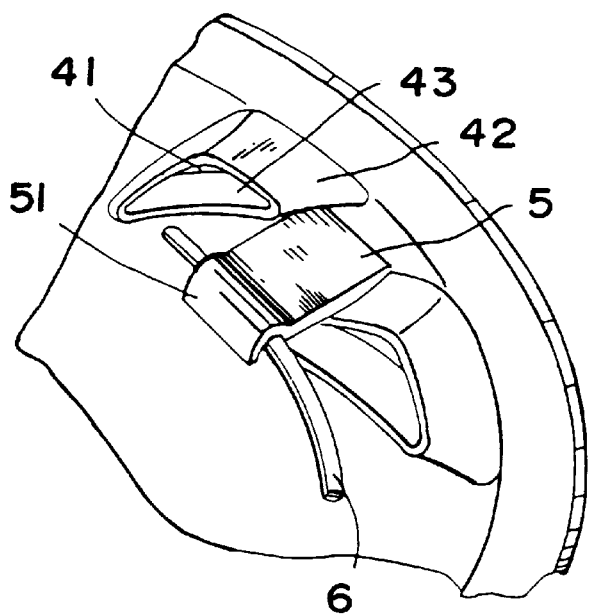
FIG. 4 is a partial perspective view of the preferred embodiment of the wheel rim cover structure according to the invention.

Referring to FIG. 4, the preferred embodiment of the invention herein is mainly comprised of a circular plate (4) and a number of fastener components (5), and when the said circular plate (4) is installed, there are a number of engraved holes (41) facing outward on the surface; the edges of the engraved holes (41) extend towards the interior side of the circular plate (4) and, furthermore, there is an edge reinforcement (42) inclined towards the center of each engraved hole (41) and formed at the final extent of the edge reinforcement (42) is an end hole (43) that is smaller than the engraved hole (41); the aforesaid fastener components (5) are positioned on the surface of the circular plate (4) facing inward during installation with a retainer mount (51) formed at the end for the insertion of an ordinary coil spring (6); each fastener component (5) is positioned in between the edge reinforcements (42) and the end holes (43) of two pairs of the said engraved holes (41), and the distance from the fastener components (5) to the center of the circular plate (4) surface is less than the distance between the maximum outer edge dimension around the interior width of the engraved holes (41) and the center of the circular plate (4) surface.

Figure 5:
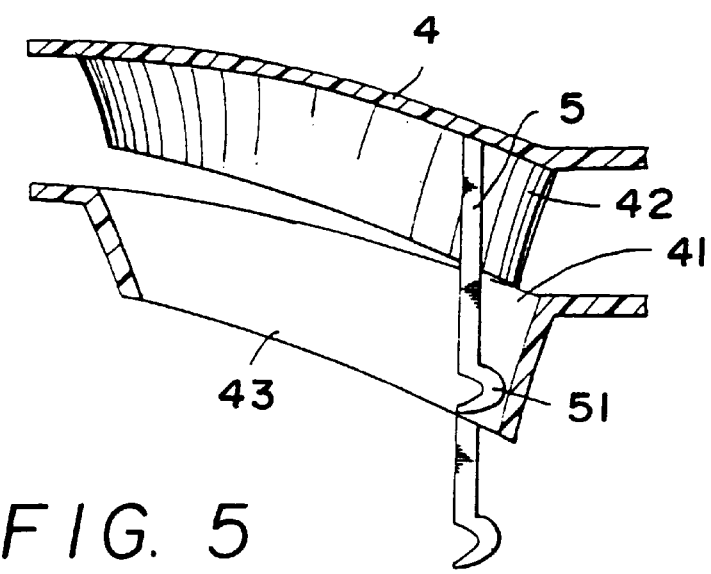
FIG. 5 is a cross-sectional view of the preferred embodiment of the wheel rim cover structure according to the invention.

Referring to FIG. 5, when the preferred embodiment of the invention herein are stacked, the fastener components (5) of the upper wheel rim cover are in alignment with the engraved holes (41) of the lower wheel rim cover, and since the distance of the fastener components (5) from the center of the circular plate (4) is less than the distance between the maximum outer edge dimension around the interior width of the engraved holes (41) and the center of the circular plate (4) surface, the fastener components (5) fit exactly into the aligned engraved holes (41) of the lower wheel rim cover, which results in a height reduction when stacked and, furthermore, reduces the amount of packaging material involved and thereby decreases overall production cost; at the same time, since each of the fastener components (5) is positioned in between the edge reinforcements (42) and end holes (43) of two pairs of the said engraved holes (41), insufficient strength may exist at the overlapping intervals between the edge reinforcements (42) and every two pairs of engraved holes (41), especially if the production design involves a slightly smaller width between the fastener components (5) on the wheel rim cover and every two pairs of engraved holes (41); however, the bottom sections of the fastener components (5) are integrated into a single entity with the edge reinforcements (42) between every two pairs of engraved holes (41), which further increases the strength of the wheel rim cover and minimizes the occurrence of the circular plate (4) bending due to surface width and insufficient thickness.

While the invention herein has been described in relation to what is considered the most practical and preferred embodiment, the invention herein is not limited to the disclosure of the embodiment but includes the various configurations covered by the spirit and scope of the broadest interpretation and equivalent arrangements thereof.

What is claimed is:

1. A wheel rim cover including a circular plate and a number of fastener components, of which when the said circular plate is installed, there are a number of engraved holes facing outward on a surface; a plurality of edges of the said engraved holes extend towards the interior side of the said circular plate and, furthermore, there is an edge reinforcement inclined towards the center of each said engraved hole and formed at a final extent of the said edge reinforcement is an end hole that is smaller than the said engraved holes; the said fastener components are positioned on a surface of the said circular plate facing inward during installation and a retainer mount is formed at the end; the improvement comprising each said fastener component is positioned in between the said edge reinforcements and the said end holes of two pairs of the said engraved holes, and the distance from the said fastener components to the center of the said circular plate surface is less than the distance between an outer edge around an interior width of the said engraved holes and the center of the said circular plate surface; when the wheel rim cover is stacked, the said fastener components of an upper wheel rim cover are in alignment with the said engraved holes of a lower enabling the said fastener components to fit exactly into the aligned said engraved holes of the lower wheel rim cover.

\* \* \* \* \*

(12) EX PARTE REEXAMINATION CERTIFICATE (5141st)
United States Patent
Sheu

(10) Number: US 6,033,033 C1
(45) Certificate Issued: Jul. 12, 2005

(54) WHEEL RIM COVER

(75) Inventor: Lih-Ching Sheu, Tainan Hsien (TW)

(73) Assignee: Kuan Hsieng Industrial Co., Ltd., Tainan Hsien (TW)

Reexamination Request:
No. 90/006,652, May 29, 2003

Reexamination Certificate for:
Patent No.: 6,033,033
Issued: Mar. 7, 2000
Appl. No.: 09/076,321
Filed: May 13, 1998

(51) Int. Cl.$^7$ .............................................. B60B 7/00
(52) U.S. Cl. ................................. 301/37.101; 301/37.33
(58) Field of Search .................... 301/37.101, 37.31, 301/37.32, 37.33, 37.42, 37.29

(56) References Cited

U.S. PATENT DOCUMENTS 5,772,287 A * 6/1998 Sheu ...................... 301/37.32

FOREIGN PATENT DOCUMENTS

| TW | 160276 | * | 6/1991 |
| TW | 282738 | * | 8/1996 |
| TW | 364463 | * | 7/1999 |

* cited by examiner

Primary Examiner—S. Joseph Morano

(57) ABSTRACT

A wheel rim cover that is mainly comprised of a circular plate and a number of fastener components. During installation, there are a number of engraved holes facing outward on the surface of the circular plate, with the edges of the engraved holes extending towards the interior side of the circular plate. Furthermore, an edge reinforcement is inclined towards the center of each of the engraved holes and formed at the final extent of the edge reinforcement is an end hole that is smaller than the engraved holes. The fastener components are positioned on the surface of the circular plate facing inward during assembly and a retainer mount is formed at the end.

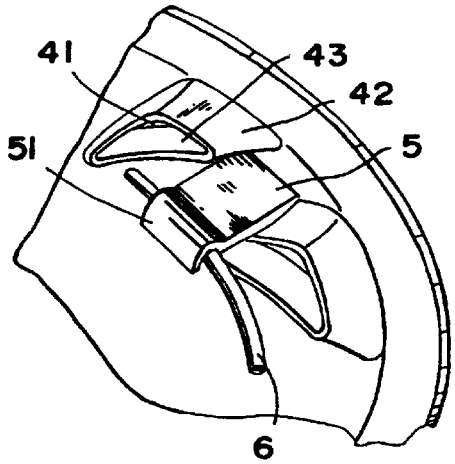

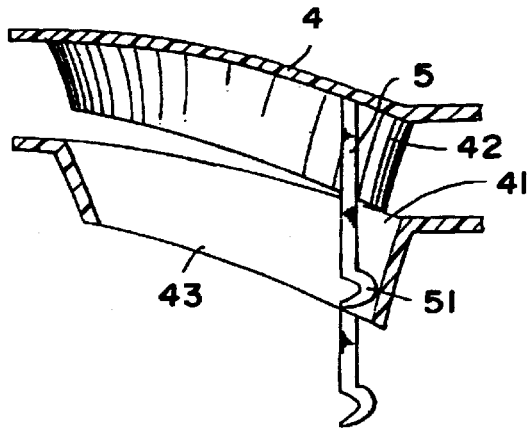

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

\* \* \* \* \*